UNITED STATES PATENT OFFICE.

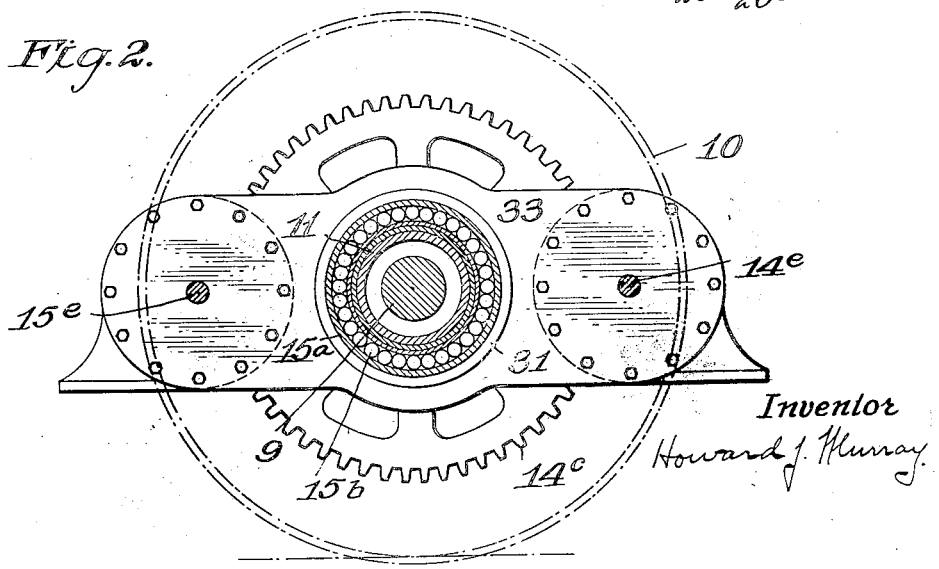

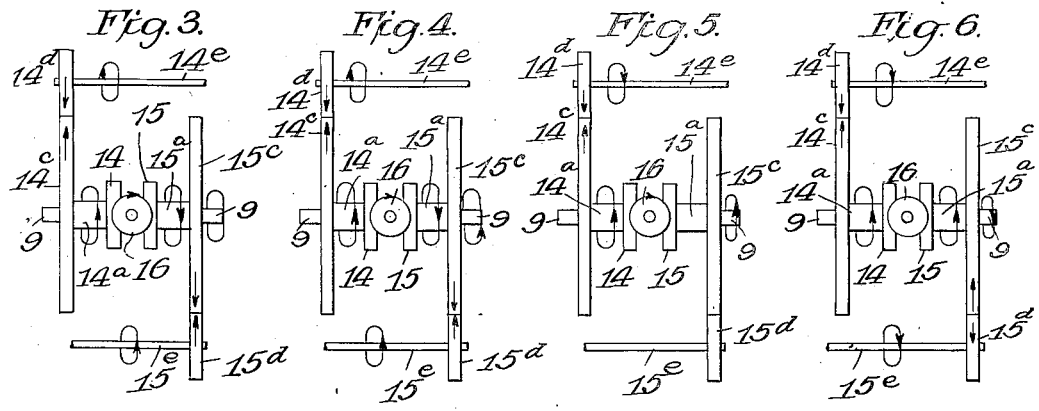
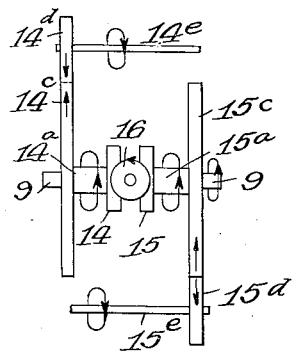
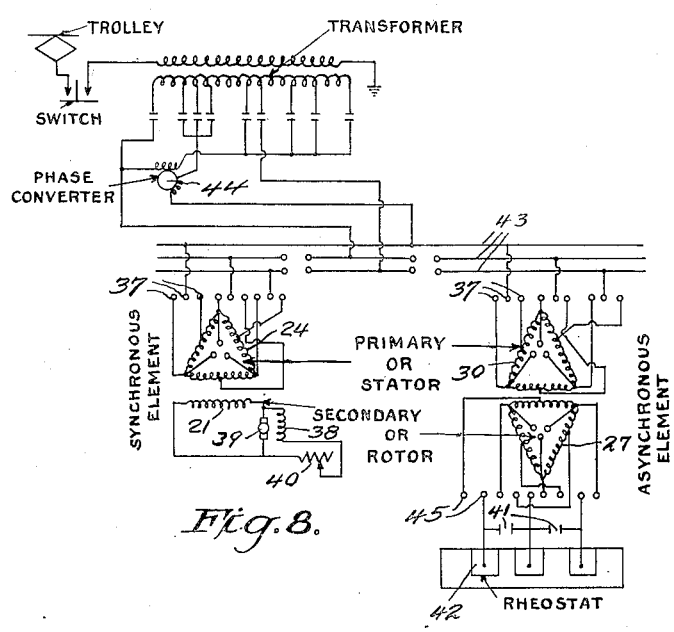

HOWARD J. MURRAY, OF BROOKLYN, NEW YORK.

ELECTROMECHANICAL POWER TRANSFORMING, CONVERTING, AND REGENERATIVE DEVICE.

1,409,061.   Specification of Letters Patent.   Patented Mar. 7, 1922.

Application filed November 21, 1918. Serial No. 263,449.

*To all whom it may concern:*

Be it known that I, HOWARD J. MURRAY, citizen of the United States, and resident of Brooklyn, in the county of Kings and State of New York, have invented certain new and useful Electromechanical Power Transforming, Converting, and Regenerative Devices, of which the following is a specification.

My invention relates in general to a power converting, transmitting and regenerating mechanism and specifically relates to a device for selectively effecting different speeds and torque values on a driven member from a driving member, said driving member normally consisting of the combination of a constantly driving constant speed electric power element and a variably driven variable speed electric power element.

One of the objects of my invention is to provide a simple combination of two dynamo electric machines in differential relation relative to each other, designed, first, to effect electro-mechanically the conversion and transmission of power from two electric driving elements together forming a driving member to a driven member under such conditions that the torque and speed of the driven member may be varied at will to assume any required condition by varying the torque and speed of one or both of the said electric driving elements; second, to vary at will the speed and torque ratio while transmitting power from a mechanical driving member to two or more driven electric elements constituting a driven member, and to permit variation of the speed and torque ratio of the mechanical driving member; third, to transmit power from a set of driving members to another driven member under such conditions that either may become the driving, while the other becomes the driven; fourth, to transmit power from a driving member to a combination of driven elements together constituting a driven member under such conditions that the speed and torque ratio of one or both of the driven electric elements may be varied to receive power from the driving member.

In one physical embodiment of my invention, I broadly attain the conversion, transmission and regeneration of power by operatively connecting in differential relation the rotors of a synchronous electric machine and an asynchronous electric machine, said rotors together forming the said driving member, although at times they may separately or together constitute the driven member. The arrangement also provides that the rotor of the asynchronous electric machine will be rotated mechanically in both directions relative to the direction of rotation of the rotor of the said synchronous electric machine and, in addition, it also provides means for differentially connecting, preferably by bevelled and spur gears, both said rotors to the said driven member.

For the purpose of explaining a theory of action which is believed to underlie the principles of my invention, let it be assumed that means are provided for separately mounting for rotary movement the rotors of so-called synchronous and asynchronous electric machines. Also assume that the said separately mounted rotors are each connected through a spur gear to a gear of a mesh bevel-geared differential set, with the differential or idler gear of the set loosely mounted on a transverse shaft at right angles and rigidly fixed to the said driven member.

Hence, we have a meshed bevel geared differential, with one of the driving gears rigidly connected by means of spur gears to the so-called rotor of the said synchronous machine to rotate the same and with the other said driving gear connected by means of a spur gear to the so-called rotor of the asynchronous machine to rotate the same, and both said driving gears meshing with the idler or differential gear.

The theory and action of synchronous and asynchronous machines are well known and accepted in the art, hence same will not be repeated in this specification and, unless otherwise mentioned, a conventional form of construction will be used.

For the purpose of description, let it further be assumed that the said dynamo electric machines are of the polyphase alternating current type, although obviously they could be of the single phase or direct current type.

Consider further that the self-propelled vehicle in conjunction with which the device is to operate is for use on a high voltage single phase alternating current system of comparatively high trolley voltage.

A main static transformer, preferably of the two coil type, is necessary for stepping down the high line or trolley voltage to a voltage suitable for use by the said dynamo electric machines and in addition a phase converter. The primary winding of this said transformer to be connected between the line or trolley switch and the usual "ground" or return lead.

To secure polyphase power from the said single phase low voltage static transformer leads in order to make one or both of the said dynamo electric machines self-starting, the said self-propelled vehicle should be equipped with a suitable phase-converter, preferably of the induction type with squirrel cage secondary, which may be carried in a suitable frame. The so-called stator winding of the said phase converter should preferably be of the induction type suitable for the required service.

The said dynamo electric machines for the purpose of description are to be of the three-phase type, suitable for the desired operating frequency.

Hereafter in the description and in the claims one of the dynamo electric machines will be known as the synchronous machine or element and the other as the asynchronous machine or element, and the combination of the two will be designated as the driving member.

The frames of the said electric machines may be of cast steel rigidly secured to and forming part of the vehicle truck frame.

The stators of the said electric machines are to be mounted on the said frames and rigidly secured in place.

The rotor of the said asynchronous machine is preferably of the wound secondary type, with coils connected to suitable collector rings.

The rotor of the said synchronous element will preferably carry the so-called field windings of the said element.

The driven member to which the above described differential arrangement is operatively attached is preferably connected through spiral springs directly to driving wheels of the said self-propelled vehicle.

The arrangement also contemplates a system of multiple unit control for the operation of one or more said vehicles from a single control point, including means for suitably operating the said dynamo electric machines in any desired combination.

In operation we may assume that the said vehicle is at rest, with power on the said static transformer and the so-called phase converter. The synchronous electric machine could be brought up to synchronism by any of the known starting methods, but the invention provides the unique method whereby the asynchronous element is rotated in the opposite direction thereby rotating the rotor of the synchronous element in the proper driving direction for forward movement and into synchronism. This is possible because as the rotor of the said asynchronous machine starts to rotate the driving gear attached to it through the spur gear is also caused to rotate and, consequently, the differential or idler gear meshed with the first named gear is caused to revolve about its shaft and thereby rotates the other driving gear attached to the said synchronous rotor by means of its spur gear in the relatively opposite direction. It should be recalled that the three named gears are in meshed geared differential formation preferably of the bevel type.

As the differential or idler gear is free to rotate on its axis, no power is transmitted to the driven member either by the synchronous or asynchronous electric machines.

Hence, we have the rotor of the asynchronous electric machine rotating at the same speed as the rotor of the synchronous electric machine but in the relatively opposite direction.

Now, it is desired to propel the said vehicle and, hence, power is required to be transmitted by the shaft of the differential or idler gear to the driven member. If electric current is supplied to the asynchronous electric motor to normally start same to revolve in the same relative driving direction as the synchronous machine is now rotating, then the inductors of the rotor of the said asynchronous machine are cut many times faster by the rotating magnetic field than under normal full speed operating conditions.

This electrical condition of the inductor of the said rotor, when its external circuit is closed, allows a current to flow in the said circuit which produces a magnetic field about the said inductor having so-called lines of force which oppose the so-called lines of force of the said revolving magnetic field from cutting the said rotor inductor and this opposition increases as the current in the said rotor inductor increases. The electric condition, or, rather, the current of the inductor, however, can increase only by having the rate of cutting thereof by the lines of force of the revolving field increase, or the resistance of the external circuit of the said rotor inductor decrease. It is obvious also that the said rotor inductor field can exist only by having the revolving magnetic field cut the said inductor. Under these conditions, the force of the said revolving field in pushing against the field of the said rotor inductor is imposed on the said inductor, so that the rotation of the said revolving or stator field tends to retard or decrease the speed of the rotor of the asynchronous machine.

As this retarding force is entirely electromagnetic, it is to be understood that this said holding force may be varied by any of the well known methods of controlling asynchronous electric machines, such as affecting the external circuits of the said machine.

As the said magnetic retarding force is affected so as to be increased, the magnetic drag on the said asynchronous rotor, and, hence, its gears will finally become greater than the inertia of the said driven member and its connected load. Hence, the speed of the asynchronous rotor will decrease, say, counter-clockwise, while the speed of the synchronous rotor remains constant clockwise.

As the differential beveled gears are meshing in order, it is obvious that to maintain the necessary mechanical relation the differential or idler gear will be caused to force its shaft into rotation about the driven member. The direction of rotation of the said driven member will be relatively the same as the direction of rotation of the synchronous rotor. As the retarding magnetic force of the asynchronous machine field is further increased and, hence, the reverse speed of the asynchronous rotor decreased, the speed of rotation of the differential shaft will be increased.

As the increase of magnetic retardation continues or the external resistance of the inductor is decreased, the rotor of the asynchronous machine will vary its speed and with maximum variation it will approach and reach zero speed, then reverse in direction and under normal conditions will finally attain its normal operating speed as an asynchronous motor.

During this interval the speed of the driven member has been correspondingly increasing and has reached normal rotation for the proper connected load. The torque may have increased or decreased according to the load imposed during the said interval on the driven member, and thence to the drive wheels of the said vehicle.

It is evident that the combination acts as a variable speed changing device, as well as the equivalent of a gear shifting device as there is practically no limit to the speed-torque ratios obtainable on the driven shaft. As an example, we may obtain one revolution on the driven member for 100,000 revolutions of the said synchronous driving element.

Now, the asynchronous rotor due to its revolving field will reach approximately the speed of the synchronous motor, varying only due to the necessary operating slip.

In fact, a proper design would allow the asynchronous machine a greater speed than that of the synchronous motor so that the asynchronous motor speed could be reduced to equal that of the said synchronous motor for normal operation.

This condition would give direct drive as the differential gear would not be revolving and both rotor gears would have the same angular velocity. The spur gears would, of course, be revolving at normal speed. Even if the speed of the asynchronous motor varied from that of the synchronous an amount equal to the slip, the loss at the most would be only a fraction of the loss in regular gear transmission.

The combination could, of course, be used for converting mechanical power into alternating or direct electric current energy as the conditions just described could be reversed in all the possible combinations.

The two electric machines could be so designed and operated as electric generators as to impart regenerated energy to the system having unity power factor; furthermore, the speed and torque ratios could be so proportioned between the two generating elements that a wide range of regenerative speed would be allowable due to the automatic operating qualities of the synchronous element.

It is evident that both the synchronous and the asynchronous machines would be caused to generate electric power at the system frequency energizing the said phase converter, and in the case of direct current machines power regeneration would simply be a matter of proper regulation and control.

In order to discuss the action of the two electric machines on the differential gear, we will note the instant of zero speed of the asynchronous rotor and normal speed of the synchronous rotor. In this case, the speed of the driven shaft is, say, one-half that of the synchronous driving gear, but the asynchronous gear is, for our purpose of description, stationary. Then we may assume that it is held in its static condition by a mechanical brake. However, the synchronous driving gear is not held. It should then be understood that as long as the asynchronous machine is rotating at a uniform constant speed in a direction opposite to the direction of rotation of the synchronous rotor that the said magnetic drag imposed on the differential or idler gear by the said asynchronous rotor gear is a static magnetic drag or torque while the effect of the said synchronous rotor is a working or speed torque. However, if the speed of the said asynchronous rotor is varied, the variation to another constant speed represents kinetic energy the same as the change of speed in said rotor when operating as a simple speed changing asynchronous motor.

Therefore, it is possible to start with the driving shaft rotating at any possible desired speed and by increasing the current strength in the asynchronous field or decreasing the external resistance of the rotor the speed of the said asynchronous rotor may be brought to zero or rest and then revolved in the opposite direction. It is obvious that a mechanical brake may be used conjointly with, or as a substitute for, the electric brake provided by the asynchronous rotor and rotating magnetic field producing members. It is also obvious that a machine may be organized whereby the asynchronous rotor may be thrown out of operation as it passes through the zero or rest speed and the said mechanical brake brought into position to hold the rotor at rest mechanically; or the change from one form of holding means to the other may be an automatic function of the speed of rotation of the asynchronous rotor and its operatively attached parts. If the change is made when the speed of the asynchronous element is passing through zero, there will be absolutely no strain or shock on the transmission system, and a minimum loss by friction on the said mechanical brake.

Furthermore, the field strength of the synchronous element may be affected or varied so that the power factor of the supply current may be made approximately unity, and, further, the electric current in the armature of the said element may be induced to lead the pressure or voltage. As the slip of the asynchronous element from synchronous condition increases, the driving force developed, or the torque, and the power factor varies with the slip, it is evident that the two power elements may be so designed and operated, either as driving or driven elements, so as to produce approximately a unity power factor for the electric power used or regenerated, and thereby increase the efficiency of the electric supply system.

Hence, we have the condition of an alternating current system having an operating load automatically insuring power factor correction.

It should also be noted that the asynchronous element may be run in the reverse direction to bring the synchronous electric element up to and into synchronism when the necessity for such operation exists and to also provide power factor correction to a desired extent. Hence, as the asynchronous element is always available for starting, it would be possible to have the synchronous element of the single phase type, thereby eliminating the corresponding capacity and weight necessary in the transformers and phase converter. This single phase element would run continuously in synchronism when once in step and would be practically self-controlling and regulating, working automatically in function with the varied asynchronous element.

The invention is susceptible of numerous physical embodiments and one type is herein illustrated for the purpose of showing an application of the invention, but it is to be understood that the showings in the drawings are largely diagrammatic, merely being sufficient in detail to show an application of the invention.

While the invention is obviously capable of use in any location where it is desired to convert alternating electric power into mechanical power at variable speed, the invention is particularly applicable to an electrically controlled power converting and transmission system designed for use in connection with an electric locomotive and it is in connection with this particular use that the invention will be described in detail.

Various other objects and advantages of the invention will be in part obvious from an inspection of the accompanying drawings and in part will be more fully set forth in the following particular description of two forms of mechanism embodying my invention, and the invention also consists in certain novel features of construction and combination of parts hereinafter set forth and claimed.

In the drawings:

Figure No. 1 is a physical embodiment of my invention in horizontal section, taken axially of the driven member and with the coacting parts shown.

Figure No. 2 is a transverse sectional view taken approximately upon the line 2—2 of Figure No. 1, looking in the direction indicated by the arrows.

Figures Nos. 3 to 7 are diagrammatic, showing the relative movement of the various parts.

Figure No. 8 is a diagram of connections, showing one general method of connecting electrically the various electric elements.

Referring to the embodiment of the invention disclosed in Figure No. 1, there is shown a dynamo electro-mechanical machine constituting a driving transmission and including a shaft or axle, 9. The shaft is mounted for rotary movement on drive wheels, 10. Floating concentric with and surrounding the axle, 9, is a so-called quill, 11, operatively connected to the said driving wheels, 10, through helical springs, 20, mounted between the drive wheel spokes and projecting arms, 20ª, and bolts, 20ᵇ, on either end of the said quill, 11.

While this quill, 11, may be considered as the driving or as the driven member of the transmission device, for the purpose of this description it will be considered that the quill, 11, is the normally driven member and is operatively connected to its load through the drive wheels, 10, and co-acting parts.

Operatively connected to the quill, 11, is a differential beveled gear train formed of at least three gears meshing in order. The first gear, 14, may be regarded as the synchronous gear, the second gear, 15, may be regarded as the asynchronous gear or due to a function hereinafter described this gear will also be considered as a retarding gear. The gear, 16, resembles the idler gear in the usual mechanical differential gear set and, likewise, is mounted free to rotate about the axis of a transverse shaft, 17, extended at right angles and is rigidly connected to the quill, 9, and is free to revolve with this driven quill.

Instead of a single intermediate gear connection, 16, between the gears, 14 and 15, preferably two such gears are used, as shown, in order to minimize strains on the shaft, 17, but it is obvious that a plurality of intermediate gears, 16, may be positioned between the facing gears, 14 and 15, in order to drive from or with the other. Fixed to and preferably forming an integral part of the synchronous gear, 14, is a second hollow axle or quill, 14$^a$, mounted for rotary movement on the floating quill, 11, by means of roller bearings, 14$^b$.

An intermediate gear, 14$^c$, is also mounted on quill 14$^a$ so that gear 14$^c$, quill 14$^a$ and synchronous driving gear 14 are all rigidly connected for rotation.

The gear 14$^c$ is driven by pinion, 14$^d$, rigidly connected to shaft 14$^e$, said shaft mounted for rotary movement on bearings, 18.

The rotor may be of the conventional form of synchronous rotors carrying field windings, 21, as is usual with A. C. rotors of this type.

Rigidly fixed to the vehicle body frame, 23$^a$, is a synchronous stator 23$^b$, formed of the usual laminations of closely positioned thin iron sheets, 23, proper inductor windings, 24, etc.

Fixed to and preferably forming an integral part of the asynchronous gear, 15, is a second hollow axle or quill, 15$^a$, mounted for rotary movement on the floating quill, 11, by means of roller bearings, 15$^b$.

An intermediate gear, 15$^c$, is also mounted on quill 15$^a$ so that gear 15$^c$, quill 15$^a$, and asynchronous driving gear 15 are all rigidly connected together for rotation.

The gear, 15$^c$, is normally driven by pinion 15$^d$, rigidly connected to shaft, 15$^e$, said shaft mounted for rotary movement on bearings, 26. The rotor is preferably of the wound secondary type, having coils, 27, connected to suitable collector rings, 28, and the usual laminations, 23.

Rigidly fixed to the body frame of the vehicle is the asynchronous stator, 29, having windings, 30.

The two shafts 14$^e$ and 15$^e$ are held parallel to each other and to the quill 11 by means of the bushings 31, bearings 15$^b$ and the frame 33. The bushing is positioned by the movement of the twin motor frames, 32 and 33, bolted to the vehicle frame by means of bolts, 34, and flanges, 35.

Referring to Figure 8, 43 is shown as three phase bus connecting the phase converter 44 with the two motive elements by means of the three-pole double-throw switches 37 and the two-pole single-throw switches 46. These said switches may be actuated by several methods known in the art.

The stator windings of both elements are shown in "delta" connection with intermediate taps, but same could have been indicated by the well known "star" form. The windings 24 are those of the synchronous element, and 30 are those of the asynchronous element.

The rotor of the synchronous element has pole windings 21 energized by the D. C. generator 39. Said generator having a field 38 controlled by rheostat 40 as is usual in the art.

The rotor of the asynchronous element has windings 27 with intermediate taps and leads connected to three-pole single-throw switches 45.

The rheostats 42 are used to vary the external resistance of the windings 27 and thereby control the speed and torque of the said element. The switches 41 may be designed as "running" switches.

It is obvious that the external circuits of the stators and rotors of both the synchronous and asynchronous machines may be varied at will to produce a variation in the speed and torque of the said rotors. Therefore, let it further be assumed that the frequency of the source of power supply is constant and that the synchronous rotor when once in synchronism will rotate at constant speed.

In operation, it will be understood in connection with the device as shown in Figure No. 1, first, that by affecting the external circuits of the asynchronous machine its rotor, 25, may be caused to rotate. Under these conditions, the driven quill, 11, is held stationary due to the inertia of its connected load and due to the differential gear connection disclosed, the synchronous rotor, 19, will revolve at the same speed as the asynchronous rotor, 25, but in the opposite direction. In other words, if the synchronous rotor is revolving clockwise, the asynchronous rotor is moving counter-clockwise. This may be more clearly seen by referring to Figure No. 3.

Motion will be conveyed from the pinion, 15$^d$, through the intermediate gear, 15$^c$, quill, 15$^a$, asynchronous gear, 15, intermediate gear, 16, synchronous gear, 14, quill, 14$^a$, intermediate gear, 14$^c$, pinion, 14$^d$, to synchronous shaft, 14$^e$.

With proper design the asynchronous rotor, 25, may be revolved at proper speed to bring the synchronous rotor into synchronism, and we will assume that such action has occurred.

Hence, the source of supply has been removed from the asynchronous machine and it is, therefore, being rotated by the synchronous rotor and at synchronous speed.

If now the external circuit of the asynchronous machine is affected to cause its rotating field to rotate in the opposite direction to that when bringing the synchronous rotor into synchronism, then the inductors of the asynchronous rotor will be cut by said revolving field at a high rate of speed and current will be induced therein. The current in these inductors will generate a field of force in opposition to the revolving field of the stator.

The external circuits may be affected to the extent that this opposition or drag on the inductors, 27, and, hence, the asynchronous rotor, 25, and its gears, 15$^d$, 15$^c$, and 15, will be greater than that of the connected load to which quill, 11, is operatively connected. Hence, speed and torque will be imposed on quill, 11, and motion will be given to the vehicle. This may be more clearly seen by referring to Figure No. 4.

As the external circuits of the asynchronous element or machine are still further affected to increase the drag, the speed of the rotor, 25, will approach 0 or decrease. As the mechanical relation between the three gears, 14, 15 and 16, must be definitely maintained, the gear, 16, will be driven by both driving gears, 14 and 15, and its speed will be the differential of the two.

As the speed of the rotor, 25, passes through 0, a mechanical brake, 25$^a$, (not shown), may be brought into play against surface, 25$^b$, to hold the floating rotor, 25, stationary, as shown diagrammatically on Figure No. 5.

When the rotor, 25, is held fixed by means of the mechanical brake wheel #25$^B$ and brake band 25$^A$ the force holding the said rotor is obviously static and the force of the synchronous rotor, 19, revolving the idler gear, 16, against the stationary gear, 15, is a kinetic force, as the gear, 14, is performing foot-pounds of work.

Hence, it will be understood that the force holding or retarding the rotation of the gear, 15, in a direction opposite to that of the gear, 14. approximates a static force, changing to a kinetic force only when the speed or torque of 15 is changed. With the rotor, 25, held either mechanically by the brake wheel 25$^B$ and brake band 25$^A$ or electrically by the rotating magnetic field of winding, 30, motion is transmitted from the gear, 14, to the idler gears, 16, which revolve about the teeth of the retarded gear, 15, and thus react through the transverse shafts, 17, to revolve the same and thereby rotate the driven quill, 11. By this means it is possible to start the normally driven quill, 11, rotating at any desired speed and by gradually affecting the external circuits of the asynchronous stator or rotor the speed of the quill, 11, may be increased or decreased, and the arrangement is, therefore, performing the function of a variable speed power transmission device, as is indicated diagramatically by means of Figure No. 6.

As is well known in the art, the asynchronous driving member affects the electric source of supply inductively to cause a lagging current, while the synchronous driving member will cause a leading current. Hence, each of the two machines may be so designed, operated and controlled as to electrically and inductively offset the effect of the other with a neutralizing effect as regards the vehicle as a unit. Hence, the arrangement may perform the function of a power factor correcting device.

As the strength of the rotating field of the asynchronous rotor is increased the rotor will be decreased to zero speed, and then revolved in the opposite direction. The asynchronous rotor when rotating in the same direction as the synchronous rotor becomes a driving member and when its speed equals that of the said synchronous rotor the arrangement becomes a direct drive power transmission device with two driving members direct connected.

When the vehicle has acquired a momentum, then the quill, 11, may become the driving member and, accordingly, rotate the transverse shafts, 17. The rotation of the gear, 16, about the shaft, 17, will depend upon the regulation and operation of the two mechanically driven dynamo-electric machines, having rotors, 19 and 25. If the speed and torque ratios are equal, then the gear, 16, will not turn on the shaft, 17, and both rotors will be direct driven generators. However, the invention provides an arrangement whereby either electric generating machine may be regulated to assume the greater part of the regenerated load. This means that the regenerated load may have a leading or a lagging current, depending on which electric machine is generating the greater part. Hence, the arrangement provides a regenerative power transmission device, with power factor correction, if desired, as may be seen by referring to Figure No. 7.

All of the figures described are simply suggestive, and it is evident that with the given source of energy supplied to the driving members, all the known methods in the electric art may be employed in producing arrangements, whereby the revolving or stationary fields may be caused to cut the inductors, or the inductors may be caused to pass through the lines of force comprising the said fields.

It is evident that there are many possible methods of control when a direct current armature is used. One obvious method would be to vary the strength of its operative field, the external circuit of the said armature, or both.

It is evident that any mechanical equivalent of the gears shown may be employed to obtain the same results, and that any possible gear ratio of the gears described may be used to obtain relative speeds between the rotors.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

I claim—

1. In a regenerative device, the combination with a constantly driven synchronous speed electric power member, a variably driven variable speed power member, of a resiliently connected driven member, mechanism operatively connecting the said power members so that the constant speed member rotates the variable speed member in the opposite direction to its normal direction of rotation and electrically controlled means for controlling and operating the said variable speed member to decrease its speed in the said opposite direction by the application of electric power so as to vary the torque and speed imparted to the driven member.

2. A spring supported electro-mechanical power transforming device for electric vehicles, the combination with a synchronous electric driving member, an asynchronous electric driving member, and a resilient driven member, a connecting power transmission mechanism disposed between said members and manually controlled electrically actuated means operatively associated with one of the said driving members for effecting a variation in the speed and torque ratios between said members and means for adding power to the driven member without affecting the power delivered by the first named driving member.

3. A spring supported power transmission including a differential gear set formed of two loosely mounted electrically actuated synchronous and asynchronous driving gears, an idler gear meshing with both of said first named driving gears and mounted for revolving movement relative thereto, a resiliently driven member operatively connected with said idler gear to be actuated by the revolving movement thereof, electric means designed to dampen the tendency of the said asynchronous driving gear to be moved counter-clockwise against its torque by the idler gear thereby to cause the other synchronous clockwise driving gear to revolve the idler gear on the counter-clockwise revolving gear and thus rotate the driven member and control means for regulating the effect of the said dampening means on said counter-clockwise rotating gear to bring it to zero speed and then cause it to revolve in the opposite direction.

4. In a device of the class described, including an organization comprising means for creating two revolving electro-magnetic fields of force, two rotors operatively associated with said electro-magnetic fields to be rotated at synchronous and asynchronous speeds respectively thereby, mechanical means for causing relative movement between said rotors, a resiliently mounted driven member operatively connected by said organization to be driven by the same and means associated with said organization for effecting a change in the speed and torque of the driven member.

5. In a device of the class described, the combination with a differential gear set loosely mounted, a single phase synchronous alternating electric current driving member connected to one of the end gears of the set to rotate the same, a loosely mounted asynchronous alternating electric current driving member connected to the other end gear both to rotate and to control the rotation of the same, and a driven member operatively connected to the idler gear of said set, said asynchronous member constituting part of an electric circuit and control means in said circuit for affecting the electric condition of the said synchronous element when its speed is approximately synchronous due to mechanical rotation by the said asynchronous element.

6. In a device of the class described, a combined alternating current electro-mechanical power converter and regenerative mechanism, including a rotatable shaft designed to be operatively connected to an electric locomotive either to be driven thereby or to drive the same, a differential drive, including a synchronous dynamo-electric machine and an asynchronous dynamo electric machine both said machines having rotors loosely mounted on said shaft and an idler element engaging the two said rotors to constitute a driving train, said idler element operatively connected to said shaft, a source of alternating electric energy designed to be connected to the field producing means of the said electric machines to cause the rotor of the asynchronous machine to rotate said idler and thereby bring the synchronous rotor into synchronous speed, and said asynchronous machine otherwise designed to increase or decrease its speed, when driven by the said idler due to the torque of the synchronous rotor thereby to rotate the idler against the asynchronous rotor and, hence, allow the synchronous rotor to rotate said shaft, means for changing said rotors automatically from a driving to a driven state, and electric means for varying the relative speeds of the said dynamo-electric machines when differentially driven by the said idler.

7. In a device for converting the mechanical power of a moving vehicle into alternating electric power at approximately constant frequency, the combination with a member normally constituting an electrically driven member, two alternating current dynamo-electric machines designed for synchronous and asynchronous speeds respectively and normally constituting electrically actuated driving members, a normally inactive source of power affecting said vehicle to move the same when active and a differential driving connection between the said members, of a selective control mechanism electrically operative with said driving members to place the same in condition to permit said source of power to actuate said driven member and to cause said normal driving members to become driven members and, hence, generate alternating electric current.

8. A dynamo-electric machine including means for creating two revolving electromagnetic fields of force, one having a constant and the other a variable speed of rotation, two rotors each forming part of a closed electric circuit, one designed to be rotated at synchronous speed through one of the said respective fields of force in a direction opposite to the natural direction of movement of said rotor when under the influence of said field of force and the other rotor to be rotated at synchronous speed in the natural direction by the second field, and a resilient driven member mechanically connected to said rotors and designed to have its speed a function of the difference of speed between said rotors.

9. A dynamo-electric machine including means for creating a variable speed rotating alternating electro-magnetic field of force, a rotor designed to be moved through said field to generate a field of force in opposition to the first named field, means for creating a second approximately constant speed rotating alternating electro-magnetic field of force, a second rotor designed to be moved at synchronous speed by the second named rotating field thereby, mechanical means for permitting the second named rotor to tend to rotate the first named rotor in an opposite direction to its natural direction of rotation, and means operatively associated with the said mechanical means for utilizing the resistant force in the said first named rotor.

10. A resiliently mounted power transmission including a meshed geared differential set formed of a pair of electrically actuated synchronous and asynchronous speed driving gears loosely mounted on the same shaft, an idler gear meshing with both of the first named gears and mounted to revolving movement, a driven member operatively connected with said idler gear to be actuated by the revolving movement thereof and an electrically actuated means for retarding the movement of one of the driving members to cause the other driving member to actuate the idler gear at approximately constant speed against said retarded gear and thereby rotate the driven member.

11. A power-factor correcting organization for vehicles moving on a fixed track, the combination of a synchronous electric member, an asychronous electric driving or driven member, both members mounted for rotary movement on the same shaft, a resilient connecting power transmission mechanism disposed between said members and automatic electrically actuated means operatively associated with both of said driving members for effecting a variation in the speed of one and torque ratio of the other thereby, and also effect a variation electrically so that the inductive effect of the synchronous member on the source of supply offsets the inductive effect of the asynchronous member.

12. In an alternating current electric power transmission, power converting, synchronous frequency regenerating, electric braking, power-factor correction, spring supported, resilient device, the combination with a resilient member normally constituting a driven member, a normally inactive source of power, a normally active source of alternating current electric power of uniformly constant voltage and frequency, two members normally constituting electrically actuated driving members including a synchronous electric machine and an asynchronous electric machine operatively connected to the said driven member to drive or be driven thereby, manually operated control means for varying the speed of the asynchronous members thereby allowing the synchronous member to rotate at approximately synchronous speed whether driving or driven.

13. In a device of the class described, a combined alternating current electro-mechanical power transmission, power converting, variable speed regenerating, electric braking, power factor correcting, reversible, variable speed, spring supported resilient device for movable vehicles including a rotatable shaft designed to be operatively connected to an electric locomotive either to be driven thereby or to drive the same, a differential drive, including a synchronous electric machine and an asynchronous electric machine both said machines having rotors loosely mounted and an idler element engaging the two said rotors through pinions to constitute a driven train, said idler element operatively connected to said shaft, a source of alternating current energy of uniform voltage and frequency designed to be connected at will to the field producing means of the said electric machines to cause the rotor of the asynchronous machine to rotate said idler and thereby bring the synchronous rotor into synchronous speed and hence a driving member, and said asynchronous machine otherwise designed to increase or decrease its speed when driven by the said idler due to the torque of the driving synchronous rotor thereby to rotate said idler about said shaft, means for changing said rotors from a driving to a driven state thereby allowing the synchronous machine to generate energy at the supply voltage and frequency.

Signed at New York, in the county of New York and State of New York, this 20th day of November, A. D. 1918.

HOWARD J. MURRAY.

Witness:
HAROLD S. RICHMOND.